(12) United States Patent
Shrader et al.

(10) Patent No.: US 6,976,076 B2
(45) Date of Patent: Dec. 13, 2005

(54) ARCHITECTURE FOR THE GRAPHICAL MANAGEMENT AND ANALYSIS OF AUTHENTICATION TOKENS

(75) Inventors: Theodore Jack London Shrader, Austin, TX (US); Randy Scott Humphrey, Austin, TX (US); Davis Kent Soper, Cedar Park, TX (US); Xiaoyan Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 655 days.

(21) Appl. No.: 09/895,223

(22) Filed: Jun. 29, 2001

(65) Prior Publication Data

US 2003/0005349 A1    Jan. 2, 2003

(51) Int. Cl.7 ............................................. G06F 15/16
(52) U.S. Cl. ...................... 709/228; 709/227; 709/229
(58) Field of Search ................................ 709/200–253

(56) References Cited

U.S. PATENT DOCUMENTS

| | | | |
|---|---|---|---|
| 5,774,551 A | 6/1998 | Wu et al. ...................... 380/25 |
| 5,781,724 A | 7/1998 | Nevarez et al. ............. 395/186 |
| 5,950,006 A * | 9/1999 | Crater et al. ................. 717/140 |
| 5,950,199 A | 9/1999 | Schmuck et al. .............. 707/8 |
| 5,997,167 A * | 12/1999 | Crater et al. .................. 700/79 |
| 6,018,567 A * | 1/2000 | Dulman .................... 379/32.03 |
| 6,065,057 A * | 5/2000 | Rosen et al. ................. 709/229 |
| 6,118,449 A * | 9/2000 | Rosen et al. ................. 715/861 |
| 6,122,575 A * | 9/2000 | Schmidt et al. ............... 701/29 |
| 6,201,996 B1 * | 3/2001 | Crater et al. .................... 700/9 |
| 6,651,168 B1 * | 11/2003 | Kao et al. .................... 713/185 |

2003/0232176 A1 * 12/2003 Polk et al. .................... 428/167

FOREIGN PATENT DOCUMENTS

| JP | 7200479 A | 8/1995 | ........... G06F 15/00 |
|---|---|---|---|
| JP | 103453 | 1/1998 | ........... G06F 15/00 |
| JP | 10187490 | 7/1998 | ........... G06F 11/28 |
| JP | 11096120 | 4/1999 | ........... G06F 15/00 |
| JP | 11134294 | 5/1999 | ........... G06F 15/00 |
| JP | 11134298 | 5/1999 | ........... G06F 15/00 |
| JP | 11175474 | 7/1999 | ........... G06F 15/00 |
| JP | 200035929 | 2/2000 | ........... G06F 13/00 |

OTHER PUBLICATIONS

IBM Research Disclosure 432178, "Network Configuration and Test Tool", Apr. 2000, p. 783.

DeMeester, "C2 Auditing in the X Display Manager", Proceedings. Ninth Annual Computer Security Applications Conference (Cat. No. 93TH0581-9), pp. 265-271, Published: Los Alamitos, CA, USA, 1993.

Calitz, M. et al., "Security Management in a Distributed Open Environment", Information Security—the Next Decade. Proceedings of the IFIP TC11 Eleventh International Conference on Information Security, IFIP/Sec '95, pp. 396-406, Published: London, UK, 1995.

* cited by examiner

Primary Examiner—Nabil El-Hady
(74) Attorney, Agent, or Firm—Duke W. Yee; Jeffrey S. LaBaw; Francis Lammes (57) ABSTRACT

An analysis of at least one authentication token for an application is provided. At least one login module within the application is identified. Responsive to a failure to access the application, principal information is retrieved associated with the at least one login module. A recovery action is then generated. The recovery action corresponds to the failure and the principal information.

38 Claims, 6 Drawing Sheets

610 — LOGIN MODULE NAME: LOGIN 1
620 — PRINCIPAL NAME: PRINCIPAL 1 — 505
630 — CREATION TIME: 6/2/2001 10:35 AM
640 — STATUS: SUCCESSFUL

650 — [OK]   [NEXT] — 660

705 — LOGIN MODULE NAME: LOGIN 1
710 — PRINCIPAL NAME: PRINCIPAL 3 — 515
715 — CREATION TIME: JUNE 2, 2001 10:36 AM
720 — STATUS: FAILED
725 — CAUSE OF FAILURE:

JAVA EXCEPTION NAME – VALUE STACK — 730

735 — SUGGESTED RECOVERY:

ADD PERMISSION FOR PRINCIPAL TO POLICY FILE — 740

[ATTEMPT RECOVERY]   750 — STATUS OF RECOVERY:   [RECOVERY SUCCESSFUL]
745

760 — [OK]   [NEXT] — 765

FIG. 8A ns or personal activity for private e-mail, home banking, and monetary transactions require a wide range of security solutions where the value of the data, and thus the threat, may be quite varied.

ARCHITECTURE FOR THE GRAPHICAL MANAGEMENT AND ANALYSIS OF AUTHENTICATION TOKENS

BACKGROUND OF THE INVENTION

1. Technical Field

The present invention relates to an architecture for graphical representation. More particularly, the present invention relates to management and analysis of authentication tokens in Java. Still more particularly, the present invention relates to an architecture for a graphical representation of the management and analysis of authentication tokens in Java.

2. Description of Related Art

With the proliferation of computer business and the ever expanding internets and Internets, vendors are scrambling to meet the security needs of their customers. Vendors are presented with security issues in a broad range of applications. Electronic commerce in business-to-business and home-to-business applications implies a selectable range of security solutions which are difficult to incorporate in a single application. Content distribution of software, reference information, educational material, or entertainment content require new algorithms and protocols to keep ahead of attacks from hackers. Metering of content, service, or both, and the requirement for secure storage of state and value becomes more important with the increasing number of protocols and cryptographic applications. Securing business or personal activity for private e-mail, home banking, and monetary transactions require a wide range of security solutions where the value of the data, and thus the threat, may be quite varied.

The CDSA (Common Data Security Architecture) was conceived by the Intel Corporation 2200 Mission College Blvd. Santa Clara, Calif. 95052 in response to the above mentioned concerns. CDSA describes a pluggable model for cryptographic and certificate services. This architecture is most commonly implemented as a set of DLLs (Dynamically Linked Libraries). A framework DLL is present that controls all access to "plugin" DLLs that actually perform CDSA services (e.g., encryption, signature, digital certificate parsing, and digital certificate validation). The API (Application Programming Interface) to the framework DLL is a published standard.

Normally, all applications built to the CDSA standard will execute successfully on a given CDSA implementation. This means that all CDSA applications have access to all cryptographic services plugged in to the framework DLL.

This framework presents problems when exporting applications which support CDSA implementations. The problems occur when exporting a CDSA implementation to jurisdictions where other CDSA applications are not legally allowed to use the specific cryptographic services of the CDSA implementation, thus it may be impossible to use the CDSA implementation in a vendor's CDSA application product. One problem is that CDSA is implemented in dynamically linked cryptographic libraries, which leaves the encryption APIs open for illegal use. Another problem is that the API to the framework DDL is a published standard.

Currently vendors give up the advantages of the CDSA in order to solve these problems. They statically link cryptographic libraries to their applications. Static libraries are not flexible (e.g., untouched, the application cannot take advantage of new plugin implementations automatically) and which waste space (each application carries along a copy of the static library code and multiple copies are loaded into memory when multiple applications run).

Also, Java Authentication and Authorization Service (JAAS) has recently been developed. JAAS is a new and emerging security model that uses login modules to provide authentication and a modified Java 2 policy to provide authorization. The login modules may perform one of many types of user identity verification such as accessing native system information, certificate databases, or smart cards. After authentication, JAAS creates principals based upon the user's defining qualities such as username, system groups, serial number, domain, and the like. The principals can then be used to define granted permissions, which represent a finer granularity of the Java 2 policy file model.

In a typical present scenario, users execute a Java application or applet under the layer of a controlling security model. When controlled by a security model, Java applications are subject to authentication as well as authorization processes that ultimately decide the success or failure of the applications. All models provide authorization based upon prescribed permissions usually contained within user created policy files. In addition, some security models utilize authentication to verify who is executing the application. For example, a database of certificates, passwords, or Kerberos tickets may be used to authenticate the user. Once authorization has been verified, the application may proceed to execute as long as it does not violate the security policy. As a result, success or failure of the application may be determined by both authentication and authorization rules.

Therefore, it would be advantageous to have a user interface that provides a comprehensive graphical representation of the authentication process. Further, it would be advantageous to offer the ability to dynamically depict active principals, as well as runtime failures in Java applications that are due to inadequate policy failures or login modules.

SUMMARY OF THE INVENTION

The present invention provides an analysis of at least one authentication token for an application. At least one login module within the application is identified. Responsive to a failure to access the application, principal information is retrieved associated with the at least one login module. A recovery action is then generated. The recovery action corresponds to the failure and the principal information.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
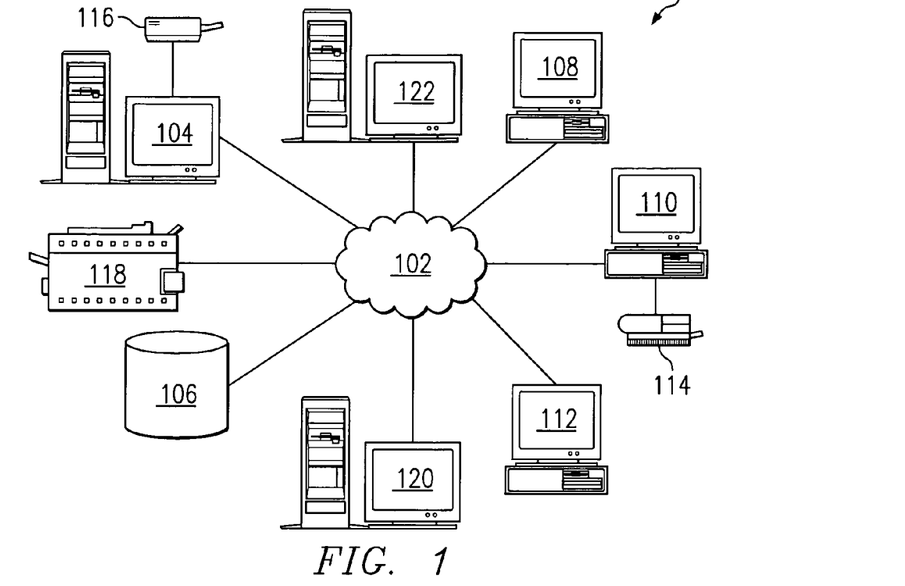
FIG. 1 is a pictorial representation of a distributed data processing system in which the present invention may be implemented.

With reference now to the figures, FIG. 1 is a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections. In the depicted example, a server 104 is connected to network 102 along with storage unit 106. In addition, clients 108, 110 and 112 also are connected to network 102. These clients 108, 110 and 112 may be, for example, personal computers or network computers. For purposes of this application, a network computer is any computer coupled to a network, which receives a program or other application from another computer coupled to the network.

In the depicted example, server 104 provides data, such as boot files, operating system images, and applications to clients 108, 110 and 112. Clients 108, 110 and 112 are clients to server 104. Distributed data processing system 100 may include additional servers, clients, and other devices not shown.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, education, and other computer systems that route data and messages. Of course, distributed data processing system 100 also may be implemented as a number of different types of networks, such as, for example, an intranet, a local area network (LAN), or a wide area network (WAN). FIG. 1 is intended as an example and not as an architectural limitation for the present invention.

Figure 2:
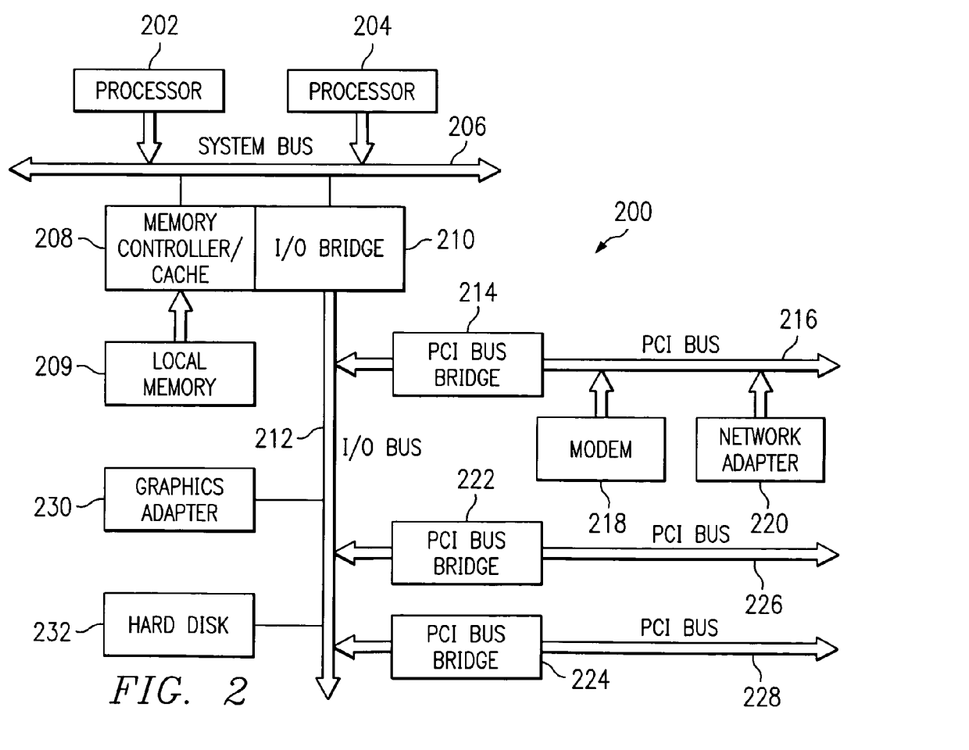
FIG. 2 is a block diagram depicting a data processing system that may be implemented as a server in accordance with a preferred embodiment of the present invention.

FIG. 2 is a block diagram depicting a data processing system that may be implemented as a server in accordance with a preferred embodiment of the present invention. Data processing system 200 may be an example of server 104 in FIG. 1. Data processing system 200 may be a symmetric multiprocessor (SMP) system including a plurality of processors 202 and 204 connected to system bus 206. Alternatively, a single processor system may be employed.

Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI buses 226 and 228, from which additional modems or network adapters may be supported. A memory-mapped graphics adapter 230 and hard disk 232 may also be connected to I/O bus 212 as depicted either directly or indirectly.

Figure 3A:
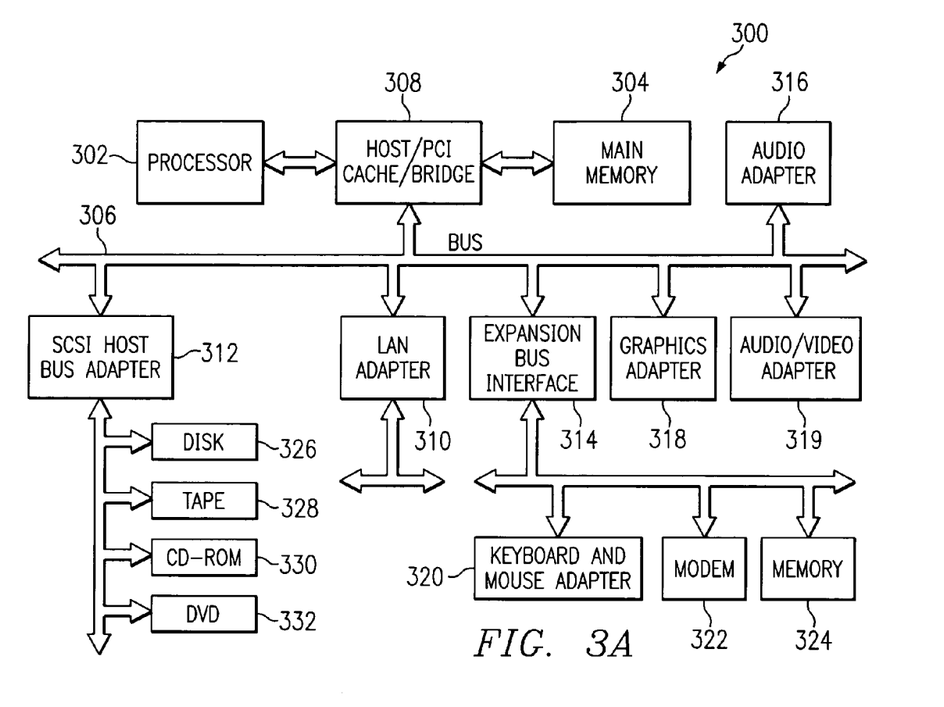
FIG. 3A is a block diagram illustrating a data processing system in which the present invention may be implemented.

FIG. 3A is a block diagram illustrating a data processing system in which the present invention may be implemented. Data processing system 300 may be an example of a client computer such as clients 108, 110, and 112 in FIG. 1. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots.

Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations support three or four PCI expansion slots or add-in connectors.

An operating system runs on processor 302 and is used to coordinate and provide control of various components within data processing system 300 in FIG. 3A. The operating system may be a commercially available operating system such as a UNIX based operating system, AIX for instance, which is available from International Business Machines Corporation. "AIX" is a trademark of International Business Machines Corporation. Other operating systems include Microsoft Windows 2000. Alternatively, the operating system may be another commercially available operating system such as JavaOS For Business™ or OS/2™, which are also available from IBM. JavaOS is loaded from a server on a network to a network client and supports Java programs and applets. An object oriented programming system, such as Java, may run in conjunction with the operating system and provide calls to the operating system from Java programs or applications executing on data processing system 300.

"Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3A may vary depending on the implementation. Other internal hardware or peripheral devices, such as flash ROM (or equivalent nonvolatile memory) or optical disk drives and the like, may be used in addition to or in place of the hardware depicted in FIG. 3A. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3A, denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide nonvolatile memory for storing operating system files and/or user-generated data. The depicted example in FIG. 3A, as well as above-described examples, are not meant to imply architectural limitations.

The present invention provides a method, a system or apparatus, and computer-implemented instructions for graphical management and analysis of authentication tokens on a variety of computer platforms and operating systems. The present invention may be implemented in most computer languages. However, the example user interface could be implemented in Java. Hence, the present invention may operate within a Java runtime environment and operate in conjunction with a Java virtual machine (JVM) yet within the boundaries of a JVM as defined by Java standard specifications. In order to provide a context for the present invention, portions of the operation of a JVM according to Java specifications are herein described.

Figure 3B:
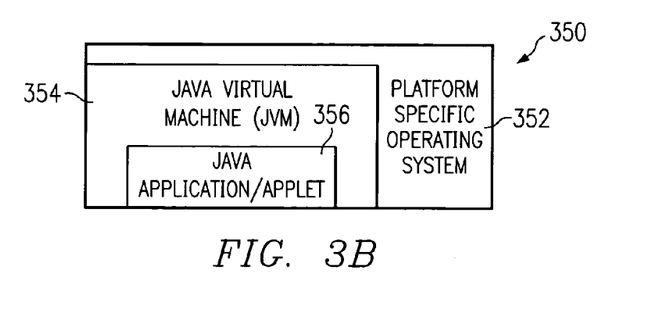
FIG. 3B is a block diagram illustrating the relationship of software components operating within a computer system that may implement the present invention.

FIG. 3B is a block diagram illustrating the relationship of software components operating within a computer system that may implement the present invention. Java-based system 350 contains platform specific operating system 352 that provides hardware and system support to software executing on a specific hardware platform. JVM 354 is one software application that may execute in conjunction with the operating system. JVM 354 provides a Java runtime environment with the ability to execute Java application, applet or servlet 356, which is a program or software component written in the Java programming language. The computer system in which JVM 354 operates may be similar to data processing system 300 described above. However, JVM 354 may be implemented in dedicated hardware on a so-called Java chip, Java-on-silicon, or Java processor with an embedded pico-Java core.

At the center of a Java runtime environment is the JVM, which supports all aspects of Java's environment, including its architecture, security features, mobility across networks, and platform independence. The JVM is a virtual computer, i.e. a computer that is specified abstractly. The Java specifications define certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for hardware platforms, such as mainframe computers and PDAs.

The JVM is the name of a virtual computer component that actually executes Java programs. Java programs are not run directly by the central processor but instead by the JVM, which is itself a piece of software running on the processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures.

Figure 4:
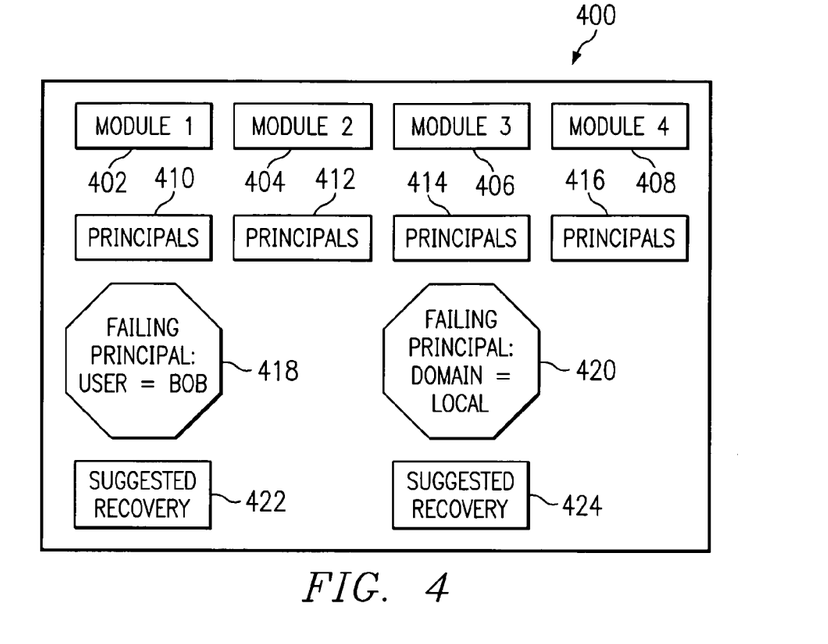
FIG. 4 is a graphical user interface representing the management and analysis of login modules and principals in accordance with a preferred embodiment of the present invention.

FIG. 4 is a graphical user interface representing the management and analysis of login modules and principals in accordance with a preferred embodiment of the present invention. In this example, icons 402, 404, 406 and 408 in FIG. 4 represent the login modules an application configures for authentication purposes. Login modules 402, 404, 406 and 408 are formatted in a configuration file much like the text policy files the Java 2 security model incorporates. Login module objects 402, 404, 406 and 408 may be achieved in a manner similar to parsing of policy files by a policy tool. However, the present invention goes beyond the abilities of a policy tool since a policy tool does not allow the analysis of authentication processes nor examine recovery possibilities. Depending on the authentication configuration, one or more login module icons may be displayed.

Icons 410, 412, 414 and 416 in FIG. 4 represent the authentication tokens created by the login modules once the user has been authenticated. This set of icons presents a dynamic view of authenticated principals currently assigned to the Java program. Due to space constraints, it may not be possible to list all the individual principals in main graphical interface 400. However, by selecting the principal authentication token icon, such as icons 410, 412, 414, or 416, this may open a new window or frame with the set of contained principals displayed. If a user or administrator chooses a principal icon, a user interface will be displayed which will include a login module principal list dialog which is further illustrated in FIG. 5. If an identical principal exists in two or more principal sets, then, this information may be displayed in the same window. In addition, some login modules may fail in their authentication attempt. In such a case, an appropriate icon may be displayed representing the failure and may replace the one or more of principal icons 410, 412, 414 or 416.

Icons 418 and 420 in FIG. 4 represent any principals that may have caused the application to fail in its execution. Icons 418 and 420 are also depicted as representing a polygon for now. Normally, an application may go through the authentication process and then proceed with normal execution while the security model performs authorization checks. Failure may occur in some instances due to system configuration issues. One example is an incorrect classpath configuration or network difficulties. However, failure frequently occurs due to missing permissions in the security policy files themselves. With a modification to the security model, it may be determined what principal or principals were the cause of the failure. Also, it may be determined which login module, such as login modules 402, 404, 406 and/or 408 the failing principals are associated with. Once this information is known, icon 418 and/or 420 may be placed in main graphical user interface 400 representing the failing principal and the login module(s) to which the failing belongs. If the user or administrator chooses a failed principal icon, a user interface will display a failed principal dialog which includes information regarding the failed principal as further illustrated in FIG. 7.

If a failure has occurred, the present invention may provide a recovery suggestion. Main graphical interface 400 may provide suggestions based on the security exception provided, the current protection domain, and the full set of permissions as defined by the security policy. For example, a suggestion may include a statement for user or policy administrator to issue a specific permission for a principal to the policy. Icons 422 and 424 may represent one or more recovery suggestions for the failed login module. More than one login module may have recovery option icons depending on the number of possible suggestions by main graphical interface 400. As with principal icons 410, 412, 414 and 416, recovery icons 422 and 424 may also be selected to display the actual recovery suggestion in a separate window or frame. If a user or administrator chooses a recovery icon, a user interface will display a failed principal dialog with a principal failure as further illustrated in FIG. 7.

Figure 5:
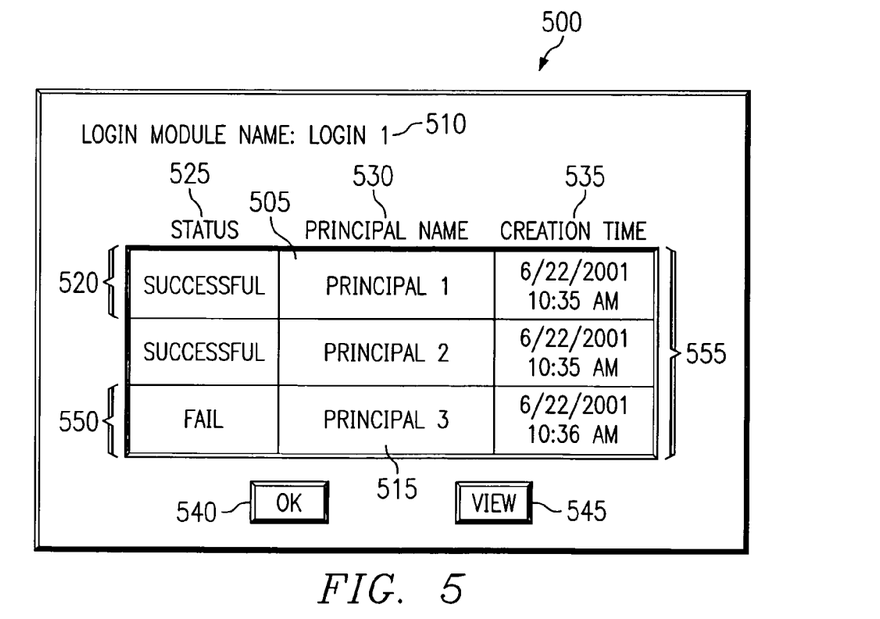
FIG. 5 is a login module principal list dialog display in accordance with a preferred embodiment of the present invention.

FIG. 5 is a login module principal list dialog display in accordance with a preferred embodiment of the present invention. FIG. 5 is an example of a display allowing a user or administrator to view login module tokens. Login module principal dialog display 500 is presented when a user or administrator chooses a principal icon, such as, for example, principal icons 410, 412, 414 and 416 in FIG. 4 under login module 402 in main display 400.

In this example, login module principal dialog display 500 is a graphical user interface although the present invention is not limited to presenting login module principal dialog display 500 as a graphical user interface and other means is conveying the information included in login module principal dialog display 500 may be provided. In this example, Login Module Name 510 indicates a login module name and is displayed within an upper portion of login module principal list dialog display 500. Login module principal list dialog display 500 displays all principal information 555 associated with login module principal list dialog display 500. Each principal, whether successful or failing upon attempting access to an application, is displayed in a row, for example, row 520, along with the principal's associated authentication information. "Principal 1" 505 may indicate that this principal has successfully accessed an application and "Principal 3" 515, in row 550, may indicate that this principal has failed to successfully access an application. Each principal row contains status column 525 which indicates whether the principal succeeded or failed to gain access to the application. Column 530 displays principal names which are attempting to access an application. Column 535 contains a creation time of a principal. The creation time assists a user or administrator in determining at what point in time a principal has failed. The user or administrator may sort the principal rows within login module principal dialog display 500 by choosing any of column title blocks 525, 530 or 535. Additional principal information may be added to the principal rows in login module principal dialog display 500 to be included in login module principal dialog display 500 for display to the user.

Within a lower portion of login module principal list dialog display 500 is "OK" button 540 in which, upon selection, removes the login module principal list dialog from display to the user or administrator. In addition, within the lower portion of login module principal list dialog display 500 is "View" button 545 in which may be selected to display information regarding a successful or failing principal. If a specific principal is chosen in login module principal list dialog display 500 and "View" button 545 is subsequently chosen, information regarding this chosen principal a subsequent dialog display displays information regarding the successful or failure of a principal to access and application. For example, if row 520 is chosen, a dialog display will be displayed to the user or administrator containing information about a successful access to the application by "Principal 1" 505 in row 520. This successful dialog display is further illustrated in FIG. 6. Alternatively, if row 550 is chosen, a dialog display will be displayed to the user or administrator containing information about a failed access to the application by "Principal 3" 515. This failed dialog display is further illustrated in FIG. 7.

Figure 6:
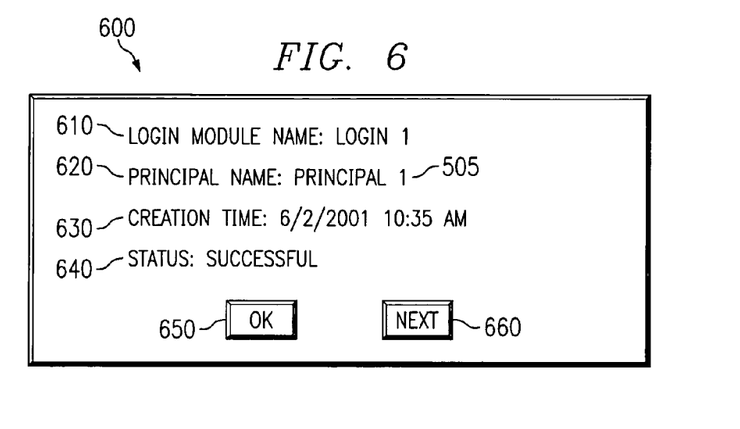
FIG. 6 is a successful principal dialog display in accordance with a preferred embodiment of the present invention.

FIG. 6 is a successful principal dialog display in accordance with a preferred embodiment of the present invention. Successful principal dialog display 600 is presented if a user or administrator chooses a successful principal, such as "Principal 1" 505, from login module principal list dialog display 500 in FIG. 5. In this example, successful principal dialog display 600 as a graphical user interface although the present invention is not limited to presenting successful principal dialog display 600 in a graphical user interface and other means is conveying the information included in successful principal dialog display 600 may be provided.

Successful principal dialog display 600 includes login module name 610, which in this example is "Login 1". In addition, successful principal dialog display 600 includes principal name 620 and principal creation time 630. Furthermore, successful principal dialog display 600 includes status 640 which indicates whether access to an application is successful or has failed. In this example, status 640 associated with successful principal dialog display 600 indicates that access to the application has been achieved thereby indicating a successful entry associated with status 640. A bottom portion of successful principal dialog display 600 contains "OK" button 650 in which a user or administrator may choose to close successful principal dialog display 600 and "Next" button 660 which a user or administrator may choose to see a next successful principal.

Figure 7:
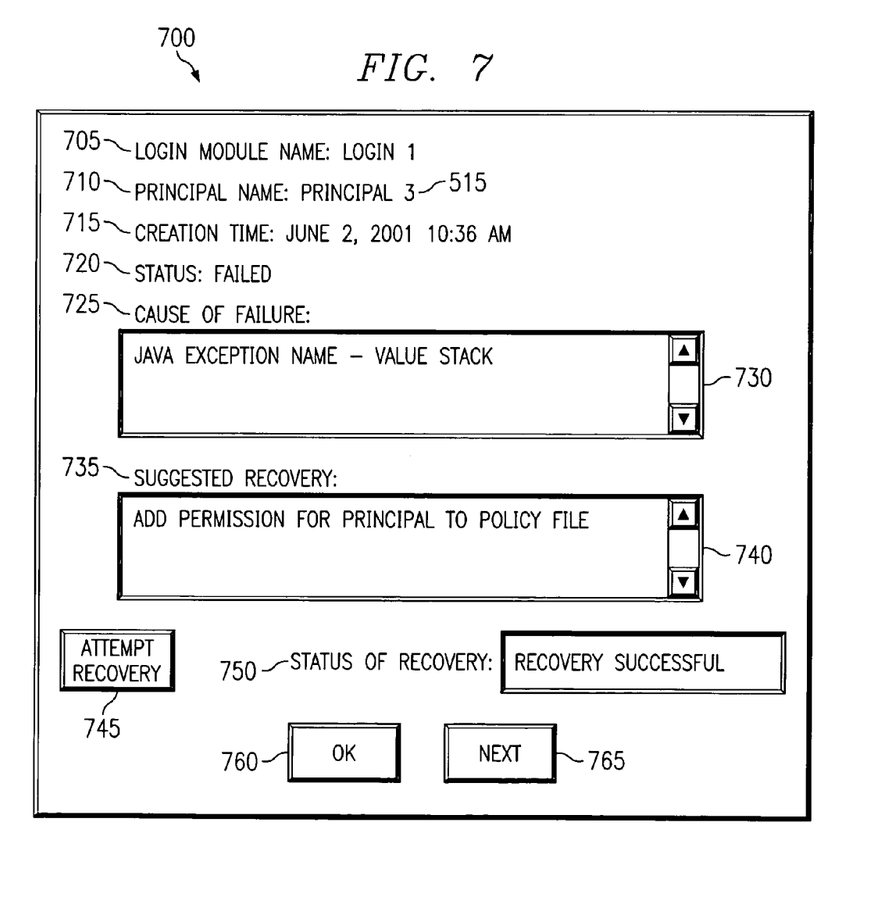
FIG. 7 is a failed principal dialog display in accordance with a preferred embodiment of the present invention.

FIG. 7 is a failed principal dialog display in accordance with a preferred embodiment of the present invention. Failed principal dialog display 700 is presented if a user or administrator chooses a failed principal, such as "Principal 3" 515, from login module principal list dialog display 500 in FIG. 5. In this example, failed principal dialog display 700 is a graphical user interface although the present invention is not limited to presenting failed principal dialog display 700 as a graphical user interface and other means is conveying the information included in successful principal dialog 700 may be provided. Failed principal dialog display 700 includes login module name 705, principal name 710, principal creation time 715 and status 720. Up to this point, failed principal dialog display 700 contains similar information as successful principal dialog display 600.

In addition, failed principal dialog display 700 includes "Cause of Failure" text box 725. "Cause of Failure" text box 725 contains information as to why a principal, such as, for example, "Principal 3" 515 did not succeed in granting access for an application. For example, "Cause of Failure" text box 725 may display a JAVA exception that caused the failure of the principal along with an exception stack. An exception stack and exception text may be expressed as:

com.mycompany.PermissionException:
Principal "Principal 1" does not have permission to
get contents for security1.txt.
at myappurl.getcount(myappurl.java:52)
at myappurl.main(myappurl.java:19)

Failure information 730 contained in "Cause of Failure" text box 725 may give a user, administrator, developer, and the like more information about a cause of the failure of the principal.

Furthermore, failed principal dialog display 700 includes "Suggested Recovery" text box 735. If a recovery action can be supplied to remedy the failure of the principal in accessing the application, "Suggested Recovery" text box 735 will be enabled and contain recovery information 740 for recovery of the failed principal. For example, recovery information 740 may include an indication that permission for the principal need to be added to a policy file. If recovery information 740 is displayed in "Suggested Recovery" text box 735, a user or administrator may choose "Attempt Recovery" button 745 to activate the suggested recovery action. If a suggested recovery action is successful this fact will be displayed in "Status of Recovery" text box 750. A successful recovery action may be a modification of a policy file. If the suggested recovery action is successful, the failed principal will then be shown as a successful principal and a display similar to successful principal dialog display 600 in FIG. 6 may appear.

However, if a suggested recovery action is not successful and thereby results in failure this fact will also be displayed in "Status of Recovery" text box 750. A failed recovery action may result from the policy file not being modified. A policy file may not be able to be modified if, for example, the policy file is "read only".

If there is no suggested recovery action displayed in "Suggested Recovery" text box 725, "Attempt Recovery" button 745 is inactive and "Suggested Recovery" text box 740 may contain information that no suggested recovery actions are available. A bottom portion of failed principal dialog display 700 includes "OK" button 760 which may be selected by a user or administrator to close failed principal dialog display 700 and "Next" button 765 which may be selected by a user or administrator to view a next failed principal.

Figure 8A:
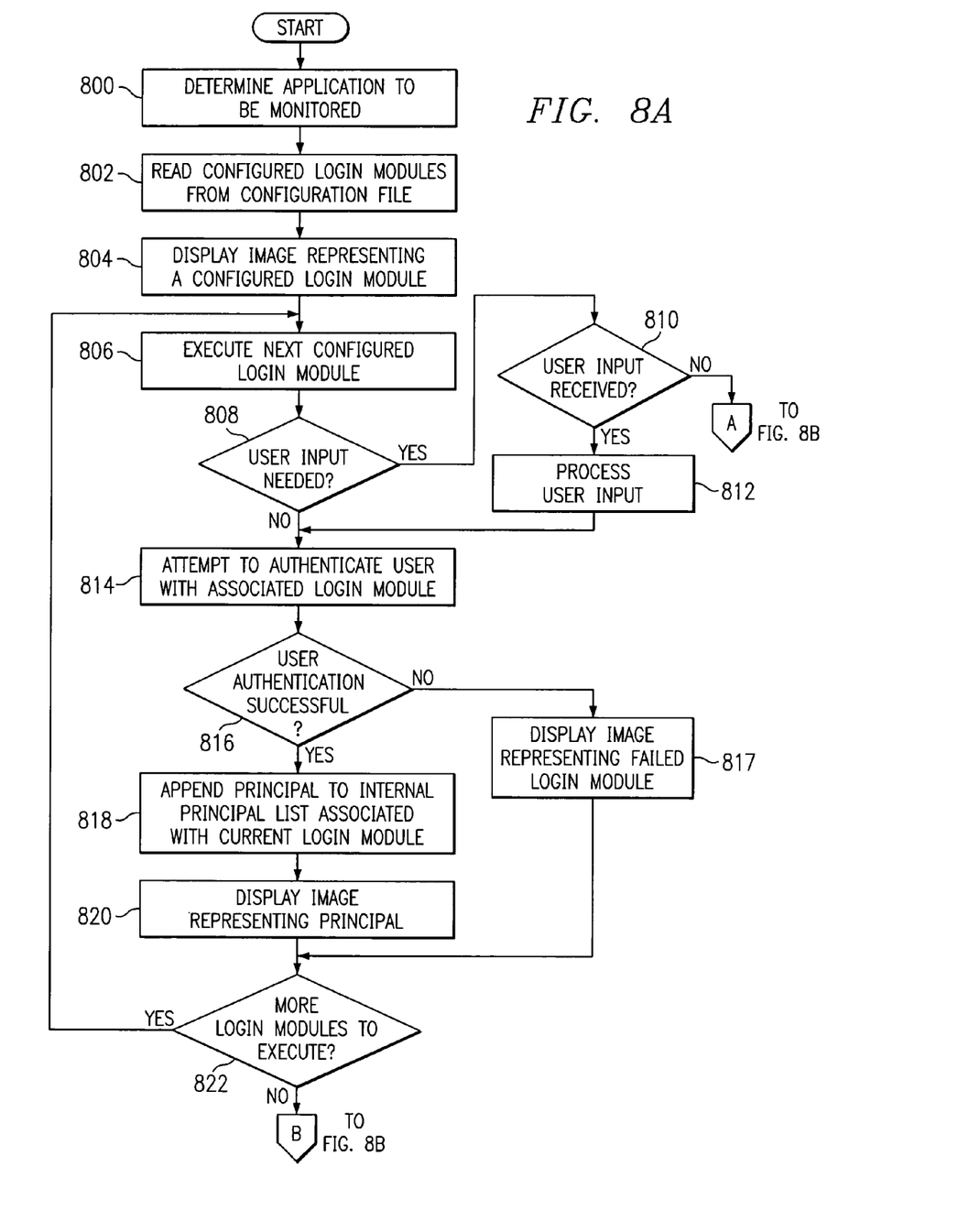
FIGS. 8A–8B are flowcharts illustrating graphical management of authentication tokens in accordance with a preferred embodiment of the present invention.
Figure 8B:
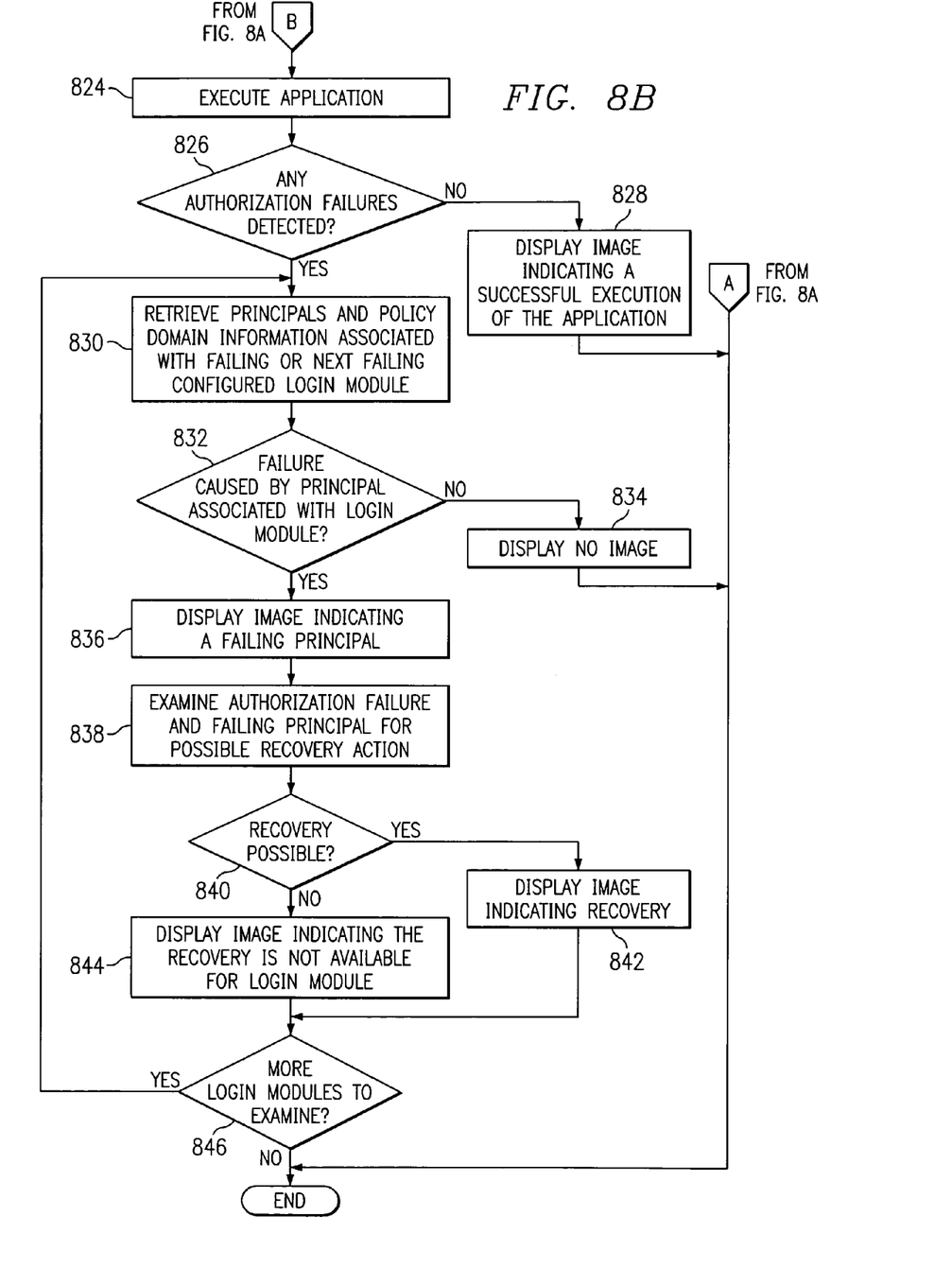

FIG. 8A–8B are flowcharts illustrating graphical management of authentication tokens in accordance with a preferred embodiment of the present invention. In this example, the operation begins by determining the application to be monitored (step 800). Configured login modules are then read from a configuration file (step 802). An image is displayed representing a configured login module (step 804). The image being displayed representing a configured login module may be modules 402, 404, 406 or 408 in FIG. 4. The next configured login module is then executed (step 806).

Then, a determination is made as to whether or not user input is needed (step 808). User input may be, for example, by way of a password, a smart card and the like. At this point user information may be retrieved from an underlying system or server. If user input is not needed (step 808:NO), then, the operation proceeds to step 814 in which an attempt to authenticate the user with the associated login module is made. If user input is needed (step 808:YES), then, a determination is made as to whether or not user input was received (step 810). If user input is not received (step 810:NO), the operation terminates. If user input is received (step 810:YES), the user input is processed (step 812).

Whether user input is not needed (step 808:NO) or user input is processed (step 812), an attempt is then made to authenticate the user with the associated login module (step 814). If user authentication is not successful (step 816:NO), an image is displayed representing the failed principal for the login module (step 817) and thereafter the operation continues to step 822 in which a determination is made as to whether or not more login modules are available for execution. This display of the failed login module may be principals 410, 412, 414 or 416 in FIG. 4. If user authentication is successful (step 816:YES), a principal is appended to an internal principal list associated with the current login module (step 818). Then an image is displayed representing the principal (step 820).

Next, a determination is made as to whether or not more login modules are available for execution (step 822). If more login modules are to be executed (step 822:YES), the operation returns to step 806 in which the next configured login module is executed. If more login modules are not to be executed (step 822:NO), the application is executed (step 824). Thereafter, a determination is made as to whether or not there are any authorization failures detected (step 826). If there are no authorization failures detected (step 826:NO), an image is displayed indicating a successful execution of the application (step 828) and thereafter the operation terminates. If there are any authorization failures detected (step 826:YES), then principals and policy domain information associated with the failing or the next failing configured login module is retrieved (step 830).

A determination is then made as to whether or not the failure was caused by a principal associated with the login module (step 832). If the failure was not caused by the principal associated with the login module (step 832:NO), no image is displayed indicating that the failure was not associated with the login module (step 834) and thereafter the operation terminates. If the failure was caused by a principal associated with the login module (step 832:YES), an image is displayed indicating a failing principal (step 836). This image may be, for example, failing principal images 418 or 420 in FIG. 4. Then, authorization failure and failing principal are examined for a possible recovery action (step 838). Next, a determination is made as to whether or not a recovery action is possible (step 840). If a recovery action is not possible (step 840:NO), then an image is displayed indicating that recovery is not possible for the login module (step 844). If a recovery action is possible (step 840:YES), then an image is displayed indicating a recovery action (step 842). The displayed recovery action may be suggested recovery actions 422 and 424 in FIG. 4.

Whether an image is displayed indicating a recovery action (step 842) or an image is displayed indicating that recovery is not available for the login module (step 844), a determination is then made as to whether or not more login modules are available for examination (step 846). If more login modules are available for examination (step 846:YES), the operation returns to step 830 in which principals and policy domain information associated with the next configured login module is retrieved. If no more login modules are available for examination (step 846:NO), the operation terminates.

Therefore, the present invention provides a comprehensive graphical representation of the authentication process. Furthermore, the present invention provides the ability to dynamically depict active principals, as well as runtime failures in Java applications that are due to inadequate policy failures or login modules.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system implemented method for analysis of at least one authentication token for an application, comprising the steps of:
   identifying at least one login module within the application;
   responsive to a failure to access the application, retrieving principal information associated with the at least one login module; and
   generating and displaying a recovery action on a user interface according to an attribute of the failure and the retrieved principal information.

2. The method of claim 1, further comprising:
   displaying analysis of the at least one authentication token in a graphical user interface.

3. The method of claim 1, further comprising:
   displaying a representation of at least one login module within the application.

4. The method of claim 1, wherein identifying at least one login module within the application includes receiving user input and identifying the at least one login module by associating the user input with the at least one login module.

5. The method of claim 4, wherein receiving user input includes receiving at least one of a password and input from a smart card.

6. The method of claim 4, in response to a failure to associate the user input with the at least one login module within the application, further comprising:
   displaying a representation of a failed login module.

7. The method of claim 4, further comprising:
   associating the principal information with the at least one login module;
   generating an internal principal list; and
   appending the principal information to the internal principal information list based on the association of the user input to the at least one login module.

8. The method of claim 7, further comprising:
   displaying a representation of the principal information.

9. The method of claim 6, further comprising:
   displaying a representation of failed principal information if the failure is caused by the principal information associated with the at least one login module.

10. The method of claim 1, wherein generating a recovery action further comprises:
    displaying a representation indicating the recovery action for the at least one login module.

11. The method of claim 1, further comprising:
    displaying a representation indicating that the recovery action is not available for the at least one login module if displaying a recovery action cannot be generated.

12. The method of claim 1, further comprising:
    displaying a representation indicating a successful execution of the application in response to a user obtaining authentication to access the application.

13. A data processing system comprising:
    a bus system;
    a communications unit connected to the bus system;
    a memory connected to the bus system, wherein the memory includes a set of instructions; and
    a processing unit connected to the bus system, wherein the processing unit executes the set of instructions to identify at least one login module within an application; responsive to a failure to access the application, the processing unit retrieves principal information associated with the at least one login module; and the processing unit generates and displays a recovery action on a user interface according to an attribute of the failure and the retrieved principal information.

14. A system for analysis of at least one authentication token for an application, comprising:
    identifying means for identifying at least one login module within the application;
    retrieving means, responsive to a failure to access the application, for retrieving principal information associated with the at least one login module; and
    generating means and displaying means for generating and displaying a recovery action on a user interface according to an attribute of the failure and the retrieved principal information.

15. The system in claim 14, further comprising:
    displaying means for displaying analysis of the at least one authentication token in a graphical user interface.

16. The system in claim 14, further comprising:
    displaying means for displaying a representation of at least one login module within the application.

17. The system in claim 14, wherein the identifying means for identifying at least one login module within the application includes receiving user input and identifying the at least one login module by associating the user input with the at least one login module.

18. The system in claim 17, wherein receiving user input includes receiving at least one of a password and input from a smart card.

19. The system in claim 17, in response to a failure to associate the user input with the at least one login module within the application, further comprising:
    displaying means for displaying a representation of a failed login module.

20. The system in claim 17, further comprising:
    associating means for associating the principal information with the at least one login module;
    generating means for generating an internal principal information list; and appending means appending the principal information to the internal principal information list based on the association of the user input to the at least one login module.

21. The system in claim 20, further comprising:
displaying means for displaying a representation of the principal information.

22. The system in claim 19, further comprising:
displaying means for displaying a representation of failed principal information if the failure is caused by the principal information associated with the at least one login module.

23. The system in claim 14, wherein generating a recovery action further comprises:
displaying means for displaying a representation indicating the recovery action for the at least one login module.

24. The system in claim 14, further comprising:
responsive to a recovery action not being generated, displaying means for displaying a display indicating that a recovery action is not possible for the at least one login module.

25. The system of claim 14, further comprising:
displaying means for displaying a representation indicating that the recovery action is not available for the at least one login module if displaying a recovery action cannot be generated.

26. The system of claim 14, further comprising:
displaying means for displaying a representation indicating a successful execution of the application in response to a user obtaining authentication to access the application.

27. A computer program product in a computer readable medium for analysis of at least one authentication token for an application, comprising:
instructions for identifying at least one login module within the application;
instructions, responsive to a failure to access the application, for retrieving principal information associated with the at least one login module; and
instructions for generating and displaying a recovery action on a user interface according to an attribute of the failure and the retrieved principal information.

28. The computer program product of claim 27, further comprising:
instructions for displaying analysis of the at least one authentication token in a graphical user interface.

29. The computer program product of claim 27, further comprising:
instructions for displaying a representation of at least one login module within the application.

30. The computer program product of claim 27, wherein the instructions for identifying at least one login module within the application further includes instructions for receiving user input and identifying the at least one login module by associating the user input with the at least one login module.

31. The computer program product of claim 30, wherein receiving user input includes receiving at least one of a password and input from a smart card.

32. The computer program product of claim 30, in response to a failure to associate the user input with the at least one login module within the application, further comprising:
instructions for displaying a representation of a failed login module.

33. The computer program product of claim 30, further comprising:
instructions for associating the principal information with the at least one login module;
instructions for generating an internal principal information list; and
instructions for appending the principal information to the internal principal information list based on the association of the user input to the at least one login module.

34. The computer program product of claim 33, further comprising:
instructions for displaying a representation of the principal information.

35. The computer program product of claim 32, further comprising:
instructions for displaying a representation of failed principal information if the failure is caused by the principal information associated with the at least one login module.

36. The computer program product of claim 27, wherein the instructions for generating a recovery action further comprises:
instructions for displaying a representation indicating the recovery action for the at least one login module.

37. The computer program product of claim 27, further comprising:
instructions for displaying a representation indicating that the recovery action is not available for the at least one login module if displaying a recovery action cannot be generated.

38. The computer program product of claim 27, further comprising:
instructions for displaying a representation indicating a successful execution of the application in response to a user obtaining authentication to access the application.

* * * * *